United States Patent [19]

Bottoms et al.

[11] Patent Number: 5,359,632
[45] Date of Patent: Oct. 25, 1994

[54] REACTOR VESSEL CAVITY SEAL PLATE

[75] Inventors: Richard T. Bottoms; Steve K. Brown, both of Lynchburg; Larry D. Dixon, Forest, all of Va.

[73] Assignee: E&W Nuclear Service Company, Lynchburg, Va.

[21] Appl. No.: 97,502

[22] Filed: Jul. 27, 1993

[51] Int. Cl.$^5$ .............................................. G21C 13/00
[52] U.S. Cl. .................... 376/203; 376/205; 376/294
[58] Field of Search ............... 376/203, 204, 205, 294, 376/287; 976/DIG. 178, DIG. 169

[56] References Cited

U.S. PATENT DOCUMENTS

| | | | |
|---|---|---|---|
| 3,841,035 | 10/1974 | Amtmann et al. | 52/21 |
| 4,584,163 | 4/1986 | Hankinson | 376/205 |
| 4,650,643 | 3/1987 | Anthony | 376/288 |
| 4,728,479 | 3/1988 | Merkovsky | 376/203 |
| 4,758,402 | 7/1988 | Schukei et al. | 376/205 |
| 4,904,442 | 2/1990 | Swidwa et al. | 376/203 |
| 4,905,260 | 2/1990 | Swidwa et al. | 376/203 |
| 5,217,676 | 6/1993 | Morandiere | 376/205 |
| 5,230,860 | 7/1993 | Behnke et al. | 376/203 |

Primary Examiner—Donald P. Walsh
Assistant Examiner—Meena Chelliah
Attorney, Agent, or Firm—Robert J. Edwards; D. Neil LaHaye

[57] ABSTRACT

A nuclear reactor vessel cavity seal plate. An annular support plate is positioned over the cavity between the reactor vessel and the shield structure and seal welded to the shield structure. Inner and outer support rings attached to the annular plate are supported by the existing beams in the annular cavity. A U-shaped flexible annular expansion ring positioned between the annular plate and reactor vessel flange has its inner diameter seal welded to the reactor vessel flange and its outer diameter seal welded to the annular plate. Ports in the annular plate provide access to nuclear instruments below the annular plate. A cover plate is removably attachable to each port to seal the ports. A closable drain is provided in the annular expansion ring. This provides a permanent seal plate that allows flooding of the cavity for refueling with it being necessary to remove only the cover plates for normal reactor operations.

2 Claims, 2 Drawing Sheets

REACTOR VESSEL CAVITY SEAL PLATE

BACKGROUND OF THE INVENTION

1. Field of the Invention

The present invention is generally related to nuclear reactor installations and more particularly to a reactor vessel cavity seal plate.

2. General Background

Commercial nuclear reactor vessels are positioned inside a cavity of a reactor shield structure such that there is an annular space between the reactor vessel and the shield structure. The annular space has instruments positioned therein for monitoring reactivity, accommodates thermal expansion of the reactor during operations, and provides a path for air flow from the bottom of the reactor vessel. Prior to refueling the reactor, the upper portion of the annular space is flooded with borated water to provide neutron shielding while the reactor vessel head is removed. To protect instrumentation in the lower portion of the space it is necessary to install a seal plate over the space before the water is added. In some reactor installations, the seal plate rests upon existing W-beam structures positioned sixty degrees apart around the annulus. The inside and outside diameter of the plate are sealed with inflatable bladders. After refueling is completed the borated water is drained from the space and the seal plate is removed and stored to allow air flow from below the reactor. During normal reactor operations the reactor vessel is subject to radial and axial thermal expansion. Seal plates currently in use for refueling operations can not be left installed around the reactor vessel and shield structure after refueling because they are unable to accommodate the thermal expansion of the reactor vessel. Attempts at developing a permanent seal plate that does not require removal after refueling have incorporated a bellows that would accommodate the thermal expansion of the reactor vessel. This has proven to be unacceptable because the bellows traps water after the space is drained. The trapped water must then be manually removed by plant personnel, resulting in increased exposure to personnel and additional equipment maintenance. Seal plates that can not be left installed around the reactor between refuelings also present the problem of requiring storage space during the interim between refuelings. From the above it can be seen that a need exists for a reactor vessel cavity seal plate that does not have to be removed between refuelings. Such a plate must accommodate thermal expansion of the reactor, provide the necessary liquid seal during refueling operations, provide access to monitoring instruments below the plate during reactor operations, and allow air flow from below the reactor.

Copending U.S. patent application Ser. No. 07/875,957 discloses a seal plate that remains in place during normal reactor operations. An annular support plate has its inner diameter resting freely upon the reactor vessel flange and its outer diameter attached to the shield structure. This allows movement of the reactor vessel during thermal expansion and contraction. A flexible annular seal is positioned over the support plate and has its inner diameter seal welded to the reactor vessel flange and its outer diameter seal welded to the shield structure. Matching ports in the support plate and seal provide access to instruments below the support plate.

Although the above seal plate provides for a permanent installation, it can result in high loads being placed on the reactor vessel.

SUMMARY OF THE INVENTION

The present invention addresses the above needs in a straightforward manner. What is provided is a reactor vessel cavity seal plate that can be left in its installed position during normal reactor operations. An annular plate formed from several sections has inner and outer support rings that rest on the existing W-beam structures in the annular cavity between the reactor and shield structure. A plurality of access ports are provided in the annular plate. A relatively thin and flexible expansion ring is attached to the inner diameter of the annular plate and the reactor vessel refueling flange. The expansion ring accommodates the thermal growth of the reactor vessel. The outer diameter of the support plate is attached to the liner on the shield structure.

BRIEF DESCRIPTION OF THE DRAWINGS

For a further understanding of the nature and objects of the present invention, reference should be had to the following description taken in conjunction with the accompanying drawings in which like parts are given like reference numerals, and wherein.

DETAILED DESCRIPTION OF THE PREFERRED EMBODIMENT

Figure 1:
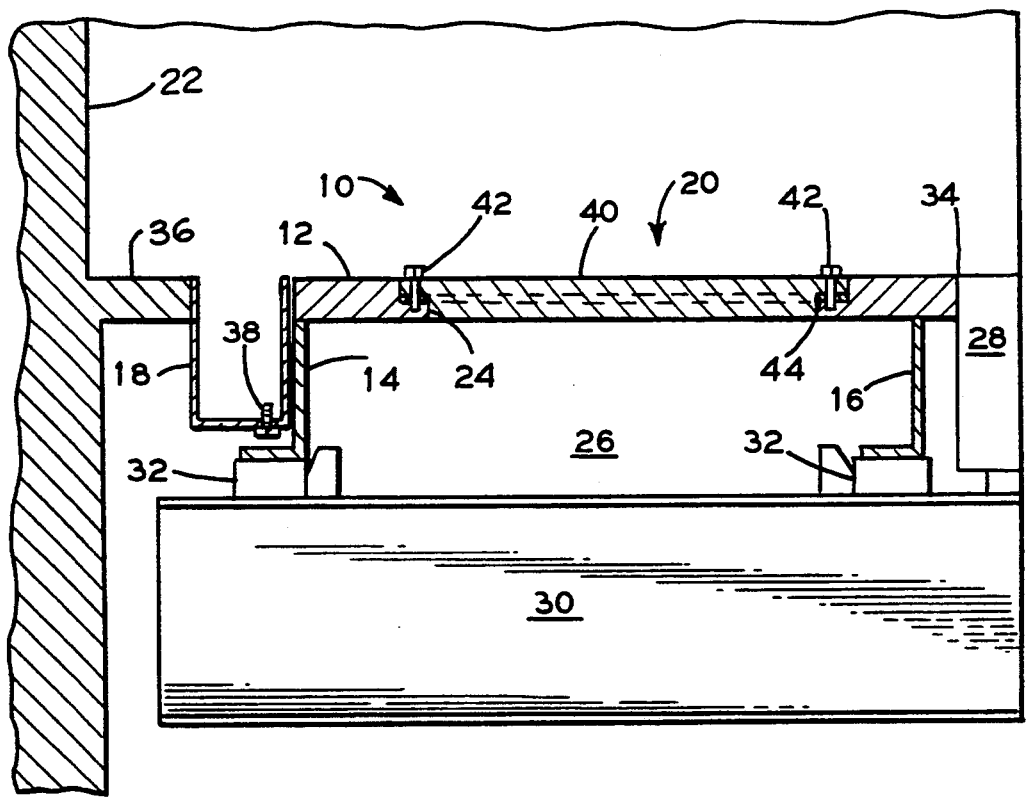
FIG. 1 is a side sectional view of the invention.

Referring to the drawings, it is seen in FIG. 1 that the invention is generally indicated by the numeral 10. Reactor vessel cavity seal plate 10 is generally comprised of annular plate 12, inner support ring 14, outer support ring 16, annular expansion ring 18, and means 20 for covering and sealing ports in annular plate 12.

Annular plate 12 is preferably formed from a sturdy material such as two inch thick stainless steel for withstanding the weight of the water when the space between reactor vessel 22 and shield structure 28 is flooded. Annular plate 12 is formed from a plurality of plates shaped such that they form annular plate 12 when positioned adjacent each other around reactor vessel 22. Each of the separate plates is seal welded to the adjacent plate to prevent leakage at the plate junctions. For ease of description, annular plate 12 will be referred to as a single item since the plurality of plates forming it all have a similar structure. Annular plate 12 is provided with a plurality of ports 24 spaced around its circumference. Ports 24 provide access to nuclear instruments positioned therebelow in annular cavity 26 between reactor vessel 22 and shield structure 28 and also allow circulation of air from beneath reactor vessel 22 during normal reactor operations. The edge of each port 24 is shaped and tapped at its edge to removably receive covering and sealing means 20. Annular plate 12 is provided with inner and outer support rings 14, 16 that extend axially therefrom. Support rings 14, 16 may be separate pieces attached to annular plate 12 or they may be integral with annular plate 12. Support rings 14, 16 may be fabricated from unequal leg stainless steel angle bar rolled to the proper diameters. Inner support ring 14 extends from the inner diameter of annular plate 12. Outer support ring 16 extends from adjacent the outer diameter of annular plate 12. Inner and outer support rings 14, 16 are supported by the existing W-beams 30 in annular cavity 26. Shims 32 may be provided between support rings 14, 16 and W-beams 30 to insure that annular plate 12 is level. The circumferential adjoining edges between annular plate 12 and shield structure 28 are welded together as indicated by the numeral 34 to provide a watertight seal.

Annular expansion ring 18, like annular plate 12, is formed from a plurality of sections. Once the sections are in position, their adjoining edges are seal welded together. The upper portion of the inner circumference of expansion ring 18 is seal welded to flange 36 on reactor vessel 22. In the preferred embodiment, expansion ring 18 is seal welded to the reactor vessel refueling flange. The upper portion of the outer circumference of expansion ring 18 is seal welded to the inner circumference of annular plate 12. One-eighth inch stainless steel is used to form expansion ring 18 in the preferred embodiment. This provides the necessary corrosion resistance and flexibility. As seen in FIG. 1, expansion ring 18 is U-shaped. With only the upper portions of expansion ring 18 being attached to plate 12 and flange 36, this provides the necessary flexibility to accommodate thermal expansion and contraction of reactor vessel 22 during normal operations. One or more drain and drain plugs 38 are provided around the lower portion of expansion ring 18 to assist in water removal after refueling operations are completed.

Means 20 for removably covering and sealing ports 24 is comprised of cover plates 40, bolts 42, and seal 44. Cover plates 40 are preferably formed from the same material as annular plate 12, two inch thick stainless steel. Each cover plate 40 is provided with a machined sealing groove to accept seal 44. Each cover plate 40 is also provided with machined holes that match the tapped holes in annular plate 12. This allows the threading of bolts 42 into annular plate 12 to fasten cover plates 40 thereto and form a seal between the cover plates 40 and annular plate 12.

Figure 2:
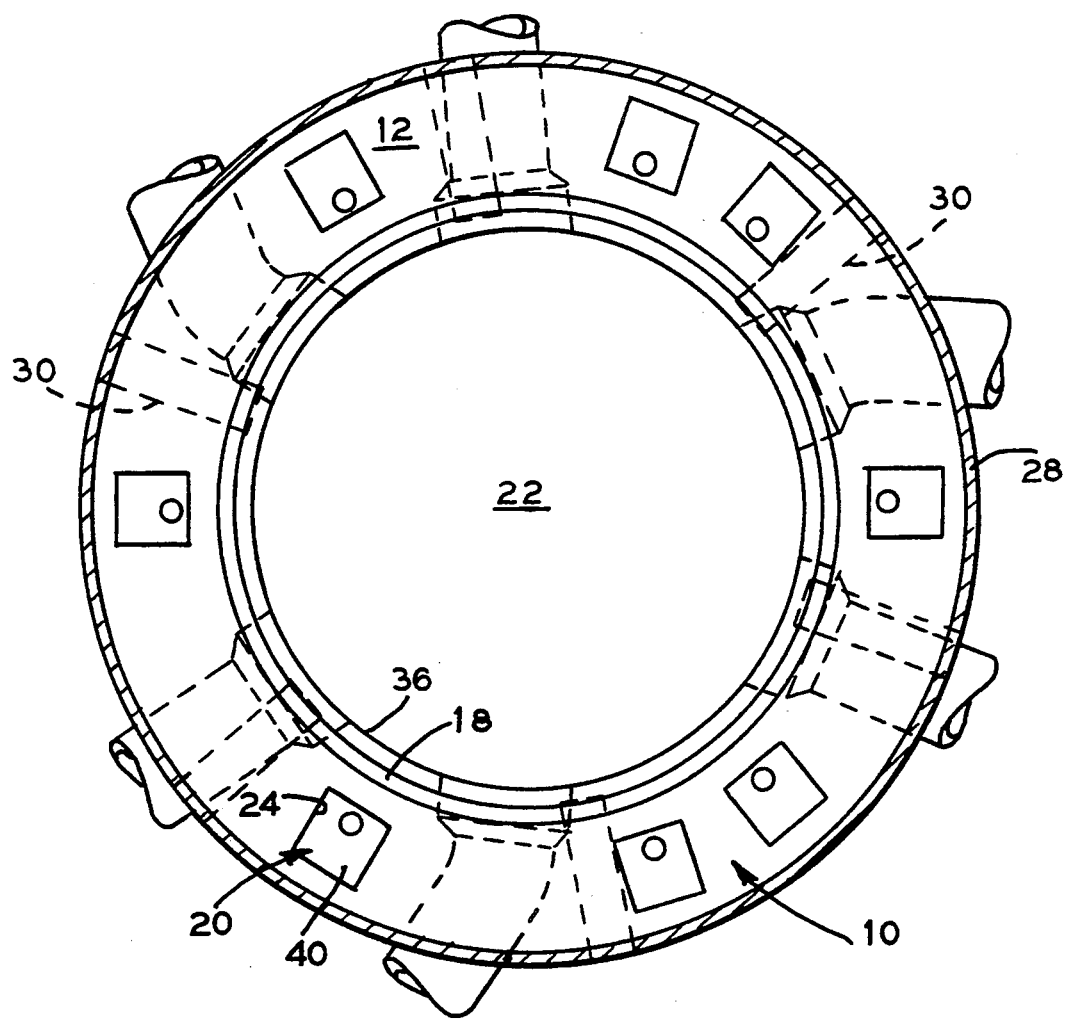
FIG. 2 is a plan view that schematically illustrates the invention installed around a reactor vessel.

During installation, a plurality of plates are positioned adjacent one another and seal welded together around reactor vessel 22 to form annular plate 12. Inner and outer support rings 14, 16 are supported by existing W-beams 30. Annular expansion ring 18, formed from a plurality of sections welded together at adjoining edges, is welded to reactor flange 36 and the inner circumference of annular plate 12. The outer circumference of annular plate is seal welded to shield structure 28. Reactor vessel cavity seal plate 10 is illustrated in plan view in FIG. 2. To begin refueling operations, cover plates 40 are bolted to annular plate 12 to cover and seal ports 24 in annular plate 12. The area above reactor vessel cavity seal plate 10 may then be flooded with borated water to provide neutron shielding before the reactor vessel head is removed. The seal provided by the invention prevents nuclear instruments positioned at the lower exterior of the reactor from being contacted and damaged by the water. The steel used for annular plate 12 and W-beams 30 provides the necessary support for the weight of the water without any weight being transferred to reactor vessel 22. After refueling operations are completed and the reactor vessel head replaced, the borated water is drained. Any water remaining in the U-shaped portion of expansion ring 18 is removed by the use of drain and drain plugs 38. Cover plates 40 may then be removed and stored to allow access to the nuclear instruments and air flow from beneath the reactor vessel. Although cover plates 40 are stored between refueling operations, they present much less difficulty for installation, removal, and storage as opposed to an entire seal plate assembly. The cover plates 40 are smaller and lighter than previously used sections of seal assemblies and thus greatly reduce clearance and special hoisting procedures previously needed. The remainder of reactor vessel cavity seal plate 10 remains in its installed position. During normal reactor operations a nozzle-supported reactor vessel will grow axially as much as 0.4 inch and radially as much as 0.38 inch while a skirt-supported reactor vessel will grow as much as 1.59 inches axially and 0.44 inch radially. Since the expansion ring 18 is U-shaped, the thermal expansion and contraction of reactor vessel 22 is easily absorbed by expansion ring 18. Also, since the top surface of annular plate 12 and cover plates 40 are flush with reactor vessel flange 36, the invention does not interfere with refueling equipment.

Because many varying and differing embodiments may be made within the scope of the inventive concept herein taught and because many modifications may be made in the embodiment herein detailed in accordance with the descriptive requirement of the law, it is to be understood that the details herein are to be interpreted and not in a limiting sense.

What is claimed as invention is:

1. In a nuclear reactor vessel installation where there are support beams in an annular cavity between a reactor vessel having a flange extending radially therefrom and a reactor shield structure, a reactor vessel cavity seal plate, said seal plate comprising:
   a. an annular plate having a plurality of ports spaced around its circumference, said annular plate having its outer circumference seal welded to the reactor shield structure;
   b. an inner support ring attached to the inner diameter of said annular plate and extending axially from said annular plate and supported by the support beams;
   c. an outer support ring attached adjacent the outer diameter of said annular plate and extending axially from said annular plate and supported by the support beams;
   d. a U-shaped flexible annular expansion ring positioned between said annular plate and the reactor vessel flange, said ring having its inner circumference seal welded to the reactor vessel flange and its outer circumference seal welded to said annular plate; and
   e. a cover plate removably attachable to each of said ports for covering and sealing the ports in said annular plate.

2. The seal plate of claim 1, further comprising a drain and drain plug provided in said annular expansion ring.

* * * * *

UNITED STATES PATENT AND TRADEMARK OFFICE
CERTIFICATE OF CORRECTION

PATENT NO. : 5,359,632
DATED : Oct. 25, 1994
INVENTOR(S) : Bottoms et al.

It is certified that error appears in the above-indentified patent and that said Letters Patent is hereby corrected as shown below:

On the title page : [73] insert B&W Nuclear Service Company.

Signed and Sealed this

Twenty-fifth Day of April, 1995

*Attest:*

BRUCE LEHMAN

*Attesting Officer*     *Commissioner of Patents and Trademarks*